United States Patent [19]
Wick et al.

[11] 3,833,913
[45] Sept. 3, 1974

[54] CLOSED-LOOP DIAPHRAGM ADJUSTMENT MECHANISM FOR A CAMERA

[75] Inventors: Richard Wick; Alfred Winkler, both of Munich; Eduard Wagensonner, Aschheim, all of Germany

[73] Assignee: Agfa-Gevaert Ag, Munich, Germany

[22] Filed: Aug. 29, 1973

[21] Appl. No.: 392,463

[30] Foreign Application Priority Data
Aug. 31, 1972  Germany............................ 2242925

[52] U.S. Cl..................... 354/42, 352/141, 354/60, 354/271
[51] Int. Cl............................ G03b 7/08, G03b 9/06
[58] Field of Search........... 95/10 C, 10 CD, 10 CE, 95/64 R, 64 D; 352/141

[56] References Cited
UNITED STATES PATENTS

| | | | |
|---|---|---|---|
| 2,906,187 | 9/1959 | Dotson et al. | 95/64 D |
| 3,340,785 | 9/1967 | Adler et al. | 95/10 CD |
| 3,427,941 | 2/1969 | Metzger | 95/10 CD |
| 3,539,252 | 11/1970 | Gleason, Jr. | 95/10 CD |
| 3,709,137 | 1/1973 | Starp | 95/10 CD |

Primary Examiner—Joseph F. Peters

[57] ABSTRACT

An arrangement is described for automatically adjusting the shutter opening in a camera in accordance with the quantity of light incident on a photosensitive detector of the camera. A pulse generator is triggered when the excitation voltage developed by the detector and applied to the pulse generator input exceeds the latter's threshold. An electromagnet energized by the triggered pulse generator incrementally advances a spring-loaded diaphragm via a modified panel and ratchet mechanism in a first direction at the pulse rate, thereby progressively decreasing the shutter opening. A light blocking member in the detector moves in synchronism with the diaphragm to progressively decrease the excitation voltage for the pulse generator as the shutter opening decreases. When such decreasing voltage falls below the pulse generator threshold, the electromagnet is disabled. The diaphragm thereupon retracts at a rate slower than the pulse rate until the corresponding movement of the light blocking member again permits the excitation voltage to exceed the pulse generator threshold, thereby establishing a stable size for the shutter opening.

10 Claims, 3 Drawing Figures

CLOSED-LOOP DIAPHRAGM ADJUSTMENT MECHANISM FOR A CAMERA

BACKGROUND OF THE INVENTION

In several known types of shutter adjustment mechanisms in cameras, particularly moving picture cameras, the voltage generated by a photosensitive detector in the camera in response to the quantity of light impinging thereon is employed to derive a succession of pulses for exciting an electromagnet. The latter responds to such excitation to incrementally stop a diaphragm across the shutter opening to vary the opening by an amount related to the light quantity impinging on the detector.

Such open-loop shutter adjusting arrangements, while satisfactory in many instances to initially set the diaphragm opening for an invariant amount of ambient light, lacks facilities for the correction of such opening if, as frequently happens, light conditions change during prolonged operation of the camera. Thus, unless supplemental manual shutter monitoring is resorted to, such changing light conditions can lead to overexposure of the film or to a lack of proper film definition.

SUMMARY OF THE INVENTION

The present invention provides a closed-loop, self regulating shutter adjustment arrangement for use with an incrementally movable diaphragm.

In one embodiment, a differential amplifier produces a central control voltage proportional to the difference between the light sensitive voltage developed at the receiver and a reference voltage. If the control voltage exceeds a predetermined threshold, a pulse generator is turned on to enable an electromagnet at the pulse rate. A magnetic, spring-loaded panel is driven by the pulsed electromagnet to correspondingly increment a toothed wheel to which a spring loaded diaphragm is affixed so that the diaphragm advances stepwise over the shutter opening in one direction. Between pulses of the electromagnet, the spring force on the diaphragm retracts in the opposite direction to increase the shutter opening. The rate of retractive motion is made slow relative to the pulse rate by means of a unidirectional retarding mechanism coupled to the toothed wheel.

Each incremental advance of the diaphragm is accompanied by a corresponding movement of a light blocking member in the detector, which serves to progressively decrease the detector output voltage in proportion to the decrease in the shutter opening size. When such voltage has decreased to the point where the output of the differential amplifier is no longer sufficient to exceed the pulse generator threshold, the electromagnet is disabled to cause the diaphragm to retract under its spring force at the retarded rate. Because of the action of the light blocking member, the resultant increase of the shutter opening is accompanied by an increase of the detector voltage until the threshold of the pulse generator is again exceeded, at which time the shutter opening is stabilized.

Such stabilization continues so long as the light conditions at the detector do not vary. Any such variation of the light conditions will cause the diaphragm to assume a new stable position corresponding to an appropriate shutter opening for the new level of light.

The pulse generator may be a conventional arrangement of semiconductor and thin film elements or, alternatively, may take the form of a mechanical vibrator. In the latter case, a pair of normally open contacts interconnect the output of the differential amplifier with the input of the electromagnet.

A contact arm carried by the panel is repetitively movable between (a) a first position in engagement with the contacts when the electromagnet remains disabled and (b) a second position spaced from the contacts when the electromagnet is enabled.

The diaphragm may be arranged to rotate about the same axis as the toothed wheel or, alternatively, may be arranged to rotate about an offset but parallel axis. In one illustrative example of this last situation, the diaphragm includes a pair of spring-loaded arms pivotable about an axis offset from the toothed wheel axis. A camming member affixed to the toothed wheel cooperates with internal opposed bosses on the diaphragm arms so that upon each incremental advance of the toothed wheel with the electromagnet is enabled, the camming member moves the diaphragm arms further apart to progressively increase the shutter opening. When the electromagnet is disabled, the diaphragm arms move toward each other by spring action to decrease the shutter opening.

BRIEF DESCRIPTION OF THE DRAWING

The invention will be further set forth in the following detailed description taken in conjunction with the appended drawing, in which.

DETAILED DESCRIPTION

Figure 1:
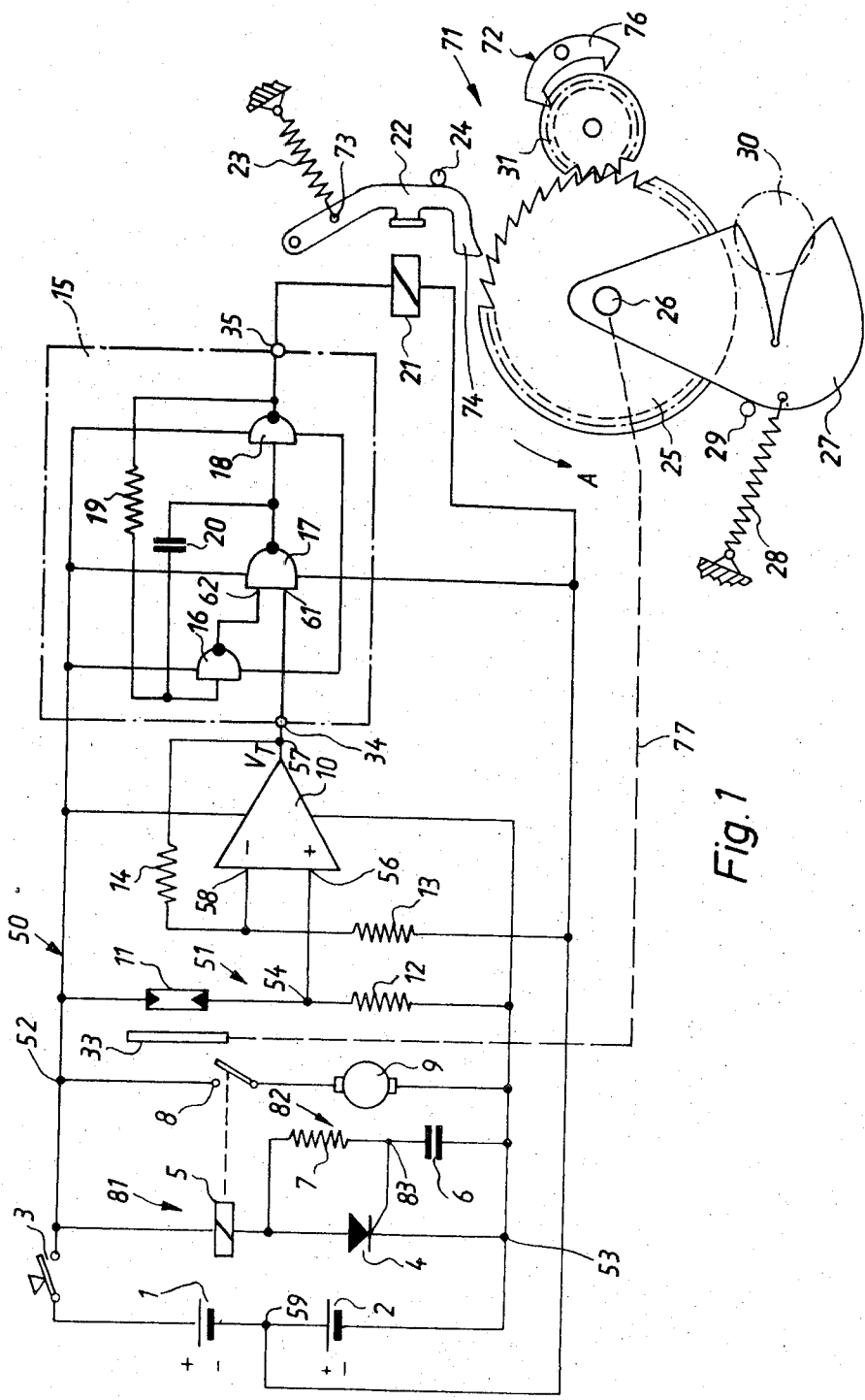
FIG. 1 is a combined block and schematic diagram of a first embodiment of a closed-loop shutter adjustment mechanism in accordance with the invention.

Referring now to the drawing, a light sensitive detector 50 for a camera, illustratively a motion picture camera, includes a voltage divider 51 consisting of a photosensitive element 11 and a resistor 12. The divider 51 is connected across terminals 52 and 53 excited by a pair of serially connected batteries 1 and 2 via a manual switch 3.

The resistance of the photosensitive element 11 decreases with increasing light impinging on it, so that the voltage appearing at an output tap 54 of the divider 51 is normally proportional to the quantity of light incident on the detector 50.

The voltage at the tap 51 is applied to one input 56 of a differential amplifier 10, which is excited by the terminals 52 and 53. The amplifier 10 is illustratively embodied as an operational amplifier and includes a feedback resistor 14 extending from an output 57 of an amplifier to a second inverting input 58 thereof. A reference voltage derived from the voltage at a tap 59 between the batteries 1 and 2 is applied to the input 58 via a resistor 13. With this arrangement, the voltage $V_T$ at the output of the amplifier 10 represents the deviation of the voltage developed by the detector 50 from the reference voltage.

The voltage $V_T$ is applied to the input of a pulse generator 15 connected between a pair of terminals 34 and 35. Conveniently, the generator 15 may be formed from semiconductive and thin film elements, the active portions of which include a NAND Gate 17 associated with a pair of inverters 16 and 18. Each such active portion is excited by the voltage between the terminal 52 and the tap 59.

As shown, one input 61 of the NAND gate 17 is coupled to the input terminal 34 of the generator 15, while the other input 62 of the gate 17 is coupled to the output of the inverter 16. The output of the gate 17 is coupled to the input of the inverter 18 and is also fed back via capacitor 20 to the input of the inverter 16. The output of the inverter 18 is coupled to the output terminal 35 of the generator 15 and is also fed back via resistor 19 to the input of the inverter 16.

The generator 15 is a threshold-controlled device, i.e., it is triggered into operation only when the voltage $V_T$ applied to its input 34 exceeds a predetermined value. Once triggered, the generator 15 operates to supply pulses at a predetermined rate to the input of an electromagnet 21, which is returned to the voltage at the tap 59.

Each resulting pulse through the electromagnet 21 is made effective via a modified panel and ratchet assembly 71 described below, to incrementally advance a spring-loaded diaphragm 27 at the pulse rate across camera shutter opening 30 in a first direction (represented by an arrow A) thereby progressively reducing the size of the opening 30. During the times when the electromagnet 21 is not excited i.e., either between the pulses of the generator 15 when the latter is triggered, or during the times when the voltage $V_T$ is insufficient to trigger it, the diaphragm 27 retracts in the opposite direction across the shutter opening 30 under the influence of the restoring force of spring 28 to increase the size of the opening. In this opposite direction, however, the movement of the diaphragm is slowed by a unidirectional retardation mechanism 72 in the assembly 71 so that the rate of retraction is slower than the rate of advance.

The assembly 71 includes a spring-loaded magnetic panel 22 attractable toward the electromagnet 21 whenever the latter is pulsed. For this purpose the panel 22 is pivotally mounted about an axis 73 for movement toward the electromagnet from a rest position against a stop 24. The pivotal movement of the panel under the attraction of the electromagnet causes a first end 74 of the panel to increment a toothed wheel 25 about an axis 26 in the direction of the arrow A. In the arrangement of FIG. 1 the diaphragm 27 is also mounted for rotation about the axis 26, so that the incrementing of the toothed wheel simultaneously effects the desired stepwise advance of the diaphragm across the shutter opening 30 in the same direction.

The retardation mechanism 72 includes a second toothed wheel 31 and a check member 76 which cooperates with the toothed wheel 25 to impede the motion of the wheel 25 only when the latter tends to rotate in a direction opposite to that of the arrow A, i.e., in the direction of retraction of the diaphragm 27.

At the termination of each pulse through the electromagnet 21, the attractive force on the panel 22 is removed and the panel is retracted by its spring 23 out of engagement with the toothed wheel 25. This permits the diaphragm 27 and the wheel 25 to retract under the force of the diaphragm spring 28 to increase the size of opening 30.

The impending effect on such retractive motion by the retardation mechanism 72 prevents the diaphragm from appreciably falling back between successive increments of advance during the "on" time of the pulse generator 15; however, it also permits the diaphragm to retract during other times by the required amount as explained below to establish the correct shutter opening corresponding to the light excitation incident on the photosensitive detector 50 of the camera.

In order to provide close-loop control of the shutter opening in accordance with the invention a movable light blocking member 33 is associated with the photosensitive element in the detector 50. The member 33 which is gauged via a link 77 for simultaneous movement with the diaphragm 27, serves to block varying amounts of the light impinging on detector 50 from illuminating the photosensitive element 11. In particular, when the diaphragm is in a position to establish the largest shutter opening, that is, when the diaphragm is in its rest position against a stop 29, the member 33 is disposed in a position to prevent only a relatively small amount of the incident light on the detector 50 from reaching the element 11. As the diaphragm is advanced in the direction of the arrow A from its rest position to progressively close the opening 30, the corresponding movement of the member 33 blocks progressively greater amounts of the impinging light from reaching the element 11. This action serves to decrease the output voltage $V_T$ of the differential amplifier 10 in proportion to the decrease in size of the shutter opening 30, and vice versa.

Thus, in operation, when the switch 3 is closed to excite the detector 50 while the diaphragm 27 is in its rest position, against the stop 29, a relatively large portion of the incident light on the detector 50 reaches the element 11 and the resulting voltage $V_T$ is large enough to trigger on the pulse generator 15. The panel 22, attracted to the electromagnet 21 upon each resulting pulse therethrough from the generator 15, advances the diaphragm 27 at the pulse rate across the shutter opening 30. As such opening decreases, the simultaneous movement of the light blocking member 33 causes the voltage $V_T$ to decrease until such voltage falls below the threshold of the generator 15. The resultant displacing of the generator 15 stops the diaphragm advance, and the latter starts to retract at a relatively slow rate under the force of the spring 27 and the shutter opening now starts to increase. Because of the corresponding movement of the light blocking member 33, the voltage $V_A$ is simultaneously increased so that the latter again exceeds the threshold of the generator 15, so that the electromagnet in turn now tends to advance the diaphragm. Consequently, the shutter opening stabilizes at a position determined by the quantity of light then impinging on the detector 50.

If, the quantity of light changes after such initial shutter adjustment is made, the closed-loop system just described could tend to position the diaphragm in a manner analagous to that described above in a different position that defines a new shutter opening corresponding to the altered light quantity. This feature assumes optimum illumination of the camera film.

Another advantage of this arrangement is that the diaphragm need only be driven by the control system in one direction, even though the closed-loop system is fully effective to stabilize the diaphragm in a position disposed in either direction relative to a previously established shutter position as the light incident on the camera detector 50 varies.

In order to prevent overexposure of the camera film (not shown) while the initial shutter adjustments are made as described above, the movement of the film past the shutter opening 30 by a film drive motor 9 may be retarded by means of a delay circuit 81. The delay circuit includes a relay 5 whose control coil is serially connected with the transconductive path of a thyristor 4 (or after semiconductive thyratron-like element) across the terminals 52 and 53. The relay also includes a pair of normally open contacts 8 that serve to couple the motor 9 across the terminals 52 and 53.

An R-C retardation circuit 82 is connected across the transconductive path of the thyristor 4. The circuit 82 includes a resistor 7 and a serially connected capacitor 6. A junction 83 between the resistor 7 and capacitor 6 is coupled to the control electrode of the thyristor 4.

The operation of the delay circuit 81 is as follows. When the switch 3 is closed to energize the detector 50, the voltage at the junction 83 is insufficient to trigger the thyristor 4 on, and the relatively large impedance presented to the coil of the relay 5 prevents such relay from operating. Therefore, the motor 9 remains unenergized. After the predetermined time delay necessary for the voltage at the junction 83 to exceed the triggering potential of the thyristor 4, the latter turns on and presents a relatively low impedance to the relay coil. The relay thereupon operates to close contacts 8 and thereby permit terminals 52 and 53 to energize the motor 9, so that the camera operation can proceed.

Figure 2:
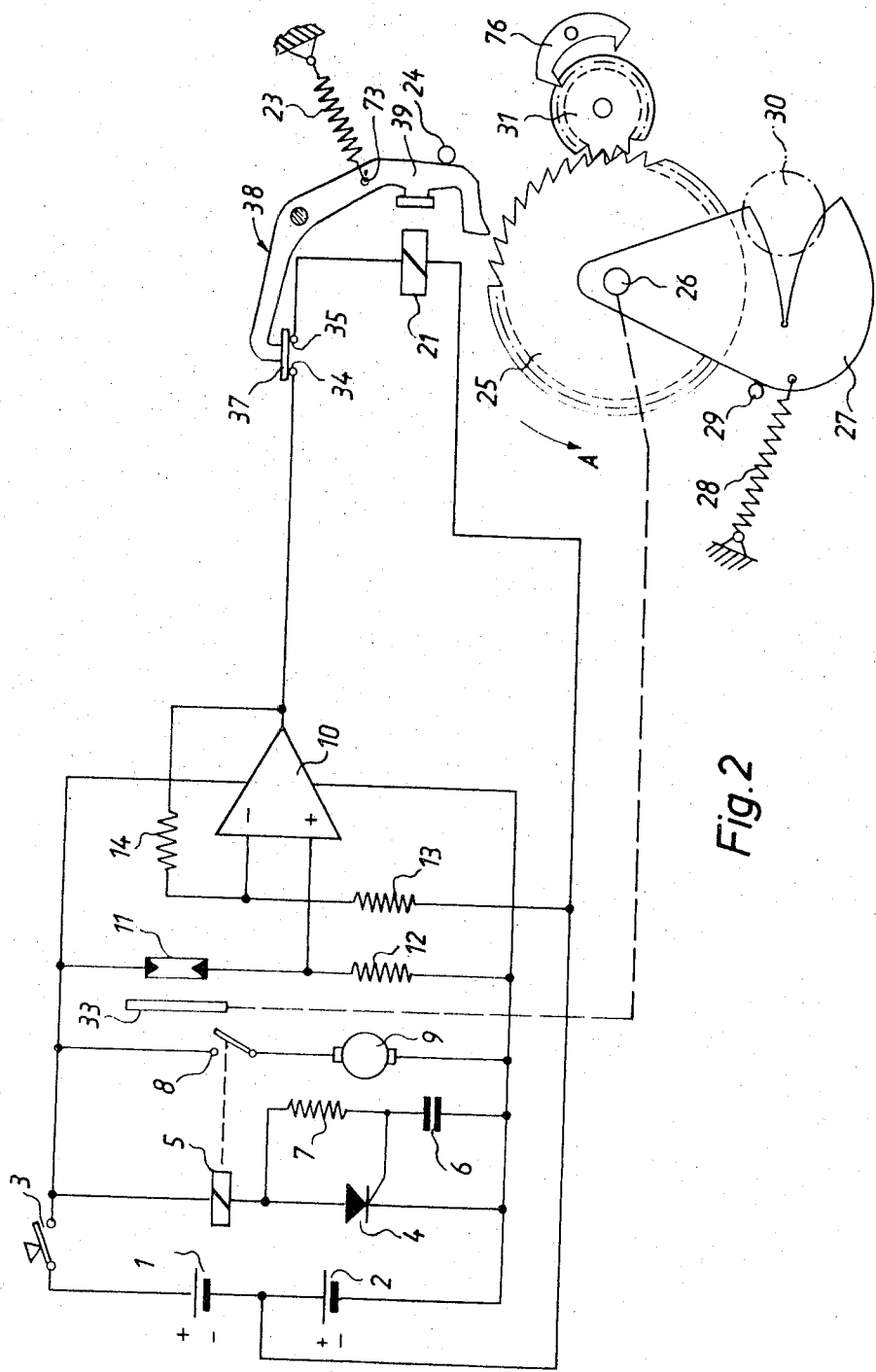
FIG. 2 is a combined block and schematic diagram of a first modification of the mechanism of FIG. 1, illustrating an alternative form of pulse generator.

A modified form of pulse generator suitable for use in the automatic shutter adjustment mechanism of the invention is shown in FIG. 2 (corresponding elements of FIGS. 1 and 2 have been given corresponding reference numerals). In FIG. 2, the normally open terminals 34 and 35 are in the form of adjacent contacts engageable by a contact member 37. The contact member is affixed to a magnetic panel 39 via a projecting arm 38. In particular, when the panel is in its normal position against stop 24, the contact member 37 engages the contacts 34 and 35 to complete a conductive path between the output of the amplifier 10 and the input of the electromagnet 21. When, under those conditions, the output voltage $V_T$ is large enough to operate the electromagnet, the latter attracts the panel 39 to (a) increment the diaphragm 27 in the direction of the arrow A as described above and (b) move the contact member 37 out of engagement with the contacts 34 and 35, thereby disabling the electromagnet 21. Such disabling returns the panel to its rest position whereupon the contact arm 37 restores the above-mentioned conductive path. This action repeats so long as voltage $V_T$ remains large enough to operate the electromagnet 21, resulting in a vibrator-type generator analagous in function to the generator 15 of FIG. 1.

Figure 3:
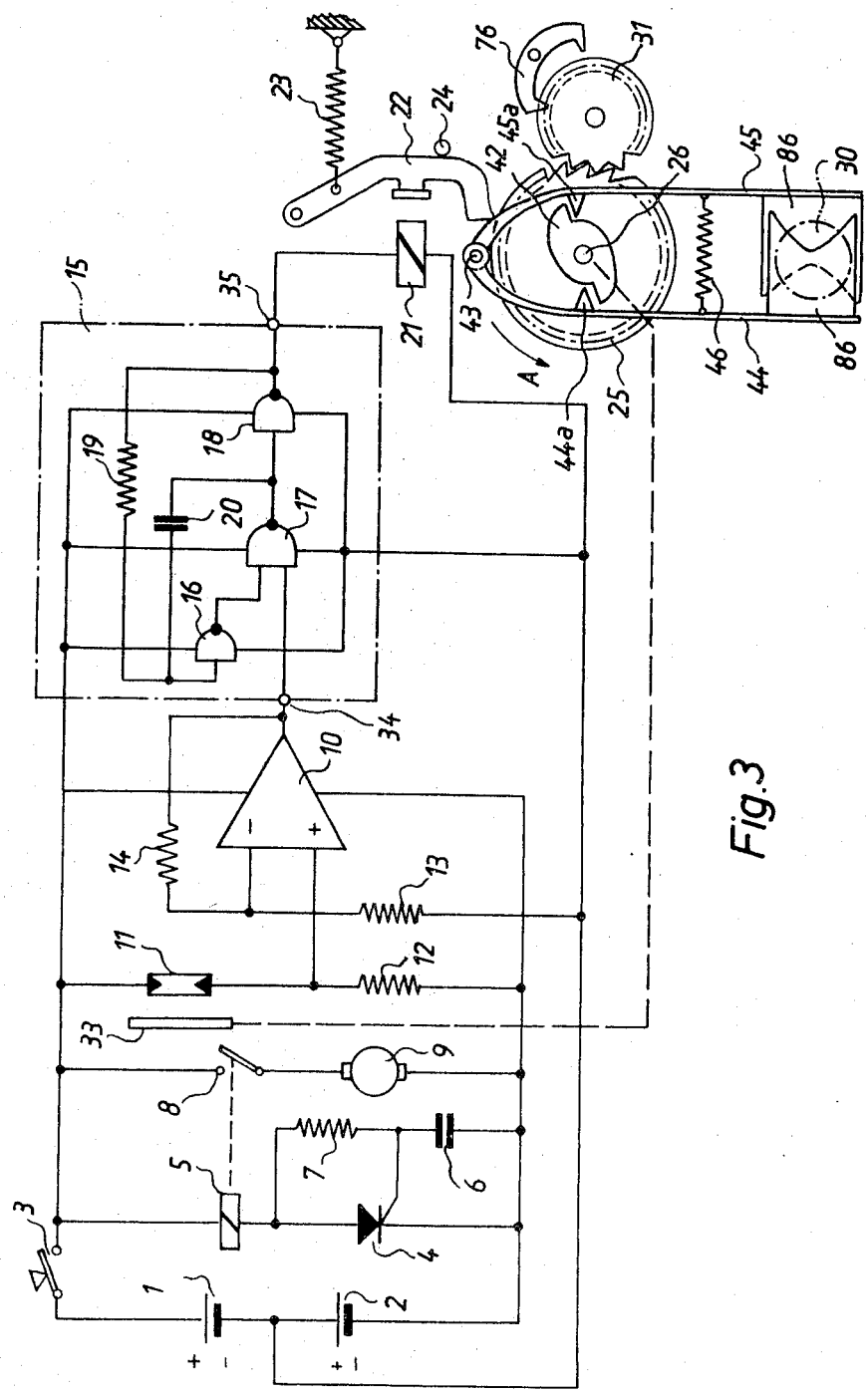
FIG. 3 is a combined block and schematic diagram of a second modification of the mechanism of FIG. 1, illustrating an offset diaphragm having a pair of spring-loaded arms.

FIG. 3 is also similar to FIG. 1 except for the construction and operation of the diaphragm. (Corresponding elements in FIGS. 1 and 3 have been given corresponding reference numerals.) In FIG. 3, the diaphragm includes a pair of arms 44 and 45 pivoted about an axis 43 parallel to but offset from the axis 26 of the toothed wheel 25. The arms 44 and 45 are loaded by a spring 46. The arms 44 and 45 have substantially U-shaped projections 86 which cooperate to vary the shutter opening 30 when such arms are simultaneously rotated in mutually opposite directions as described below.

A camming member 42 mounted for rotation with the toothed wheel 25 about the axis 26 is cooperable with a pair of opposed bosses 44a and 45a on the diaphragm arms 44 and 45, respectively. An incremental rotation of the toothed wheel 25 by the panel 22 in the direction of the arrow A when the electromagnet 21 is pulsed causes the camming member 42 and the bosses 44 a and 45 a to co-act to incrementally separate the arms 44 and 45, thereby increasing the size of opening 30. When the toothed wheel 25 is released by the panel upon disabling of the electromagnet, the spring 46 urges the arms 44 and 45 back toward each other to decrease the shutter opening 30.

In all other respects, the arrangement and operation of FIGS. 2 and 3 track those of FIG. 1.

In the foregoing, the invention has been described in connection with preferred arrangements thereof. Many variations and modifications will now occur to those skilled in the art. It is accordingly desired that the scope of the appended claims not be limited to the specific disclosure herein contained.

What is claimed is:

1. In an arrangement for adjusting the shutter opening of a camera in accordance with the quantity of light impinging on a photosensitive detector portion of the camera, wherein a succession of pulses derived from a first voltage proportional to the quantity of the impinging light effects the incremental positioning of a diaphragm over the shutter opening, the improvement which comprises:

first means operable in response to the succession of pulses for moving the diaphragm over the shutter opening in a first direction at the pulse rate to vary the size of such opening in a first sense;

second means operable during intervals when the first moving means are unoperated for moving the diaphragm over the shutter opening in the opposite direction at a rate slow with respect to the pulse rate to vary the size of such opening in the opposite sense; and means movable in synchronism with the diaphragm for varying the first voltage in accordance with the variations in the size of the shutter opening.

2. An arrangement as defined in claim 1, in which the camera has a film-driving motor, and in which the arrangement further comprises, in combination, first externally operable switching means for energizing the photosensitive detector portion, second switching means operable to energize the motor, and delay means for operating the second switching means a predetermined time after the operation of the first switching means.

3. An arrangement for adjusting the shutter opening of a camera in accordance with the quantity of light impinging on a photosensitive detector portion of the camera, wherein a first voltage proportional to the quantity of the impinging light effects the incremental positioning of a diaphragm over the shutter opening, the improvement which comprises:

normally disabled, threshold-controlled means for generating pulses at a first rate when a voltage applied to its input exceeds the threshold;

first means for coupling the first voltage to the input of the pulse generating means;

first means rendered effective when the pulse generating means are enabled for moving the diaphragm over the shutter opening in a first direction at the first rate to vary the size of such opening in a first sense;

second means rendered effective when the pulse generating means are disabled for moving the diaphragm over the shutter opening in the opposite direction at a rate slow with respect to the first rate to vary the size of such opening in the opposite sense; and means movable in synchronism with the diaphragm for varying the first voltage in accordance with the variations in the size of the shutter opening.

4. An arrangement as defined in claim 3, in which the first coupling means comprises in combination a differential amplifier having first and second inputs, second means for coupling the first voltage to the first input of said amplifier, third means for coupling a reference voltage to the second input of the amplifier, and fourth means for coupling the output of the amplifier to the input of the pulse generating means.

5. In an arrangement for adjusting the shutter opening of a camera in accordance with the quantity of light impinging on a photosensitive detector portion of the camera, wherein a normally disabled electromagnet responsive to a first voltage proportional to the quantity of the impinging light effects the incremental positioning of a diaphragm over the shutter opening, the improvement which comprises:

a differential amplifier for producing a second voltage proportional to the difference between the first voltage and a reference voltage;

threshold-controlled means operable for generating pulses at a first rate when a voltage applied to its input exceeds the threshold;

first means for coupling the second voltage to the input of the pulse generating means;

second means for coupling the output of the pulse generating means to the electromagnet for enabling the electromagnet at the first rate when the pulse generating means are operated;

first means rendered effective when the electromagnet is enabled for moving the diaphragm over the shutter opening in a first direction at the first rate to vary the size of such opening in a first sense;

second means rendered effective when the electromagnet is disabled for moving the diaphragm over the shutter opening in the opposite direction at a rate slow with respect to the first rate to vary the size of such opening in the opposite sense; and means movable in synchronism with the diaphragm for varying the first voltage in accordance with the variations in the size of the shutter opening.

6. An arrangement as defined in claim 5, in which the first moving means comprises a magnetic panel attractable when the electromagnet is enabled, a toothed wheel incrementally rotatable by the panel about a first axis when the panel is attracted, and third means for coupling the diaphragm to the toothed wheel for movement of the diaphragm in the first direction in synchronism with the incremental rotation of the toothed wheel.

7. An arrangement as defined in claim 6, in which the second moving means comprises resilient means for urging the diaphragm in the opposite direction, and unidirectional means associated with the toothed wheel for retarding the movement of the diaphragm in the opposite direction.

8. An arrangement as defined in claim 6, in which the pulse generating means comprises, in combination, a pair of normally open contacts interconnecting the output of the amplifier and the input of the electromagnet, and a contact arm affixed to the panel, the contact arm being movable between a first position in engagement with the contacts when the electromagnet is disabled and a second position spaced from the contacts when the electromagnet is enabled.

9. An arrangement as defined in claim 6, in which the third coupling means rigidly associates the diaphragm with the toothed wheel for rotation about the first axis.

10. An arrangement as defined in claim 6, in which the diaphragm comprises a pair of arms pivotable about a second axis offset from the first axis and having a pair of opposed bosses, and in which the third coupling means comprises camming means affixed to the toothed wheel for rotation about the first axis and engageable with the opposed bosses of the diaphragm arms to pivot the arms away from each other about the second axis when the toothed wheel is rotated in the first direction.

* * * * *